United States Patent
Howie (10) Patent No.: US 7,357,988 B2
(45) Date of Patent: Apr. 15, 2008

(54) MULTILAYER COMPOSITES WITH SPECIAL VISUAL EFFECTS

(75) Inventor: Douglas Warren Howie, Parkersburg, WV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/761,753

(22) Filed: Jun. 12, 2007

(65) Prior Publication Data

US 2007/0231565 A1    Oct. 4, 2007

Related U.S. Application Data

(63) Continuation-in-part of application No. 10/869,134, filed on Jun. 16, 2004, now abandoned.

(51) Int. Cl.
*B32B 27/00* (2006.01)
(52) U.S. Cl. .................. 428/500; 428/515; 428/520; 428/522
(58) Field of Classification Search ............... 428/500, 428/515, 520, 522
See application file for complete search history.

(56) References Cited

U.S. PATENT DOCUMENTS 6,589,378 B2 * 7/2003 Grefenstein et al. ........ 156/222
7,135,233 B2 * 11/2006 Gaggar et al. .............. 428/519

* cited by examiner

*Primary Examiner*—Leszek Kiliman (57) ABSTRACT

The present invention relates to multilayer composites which show special visual effects while maintaining other beneficial properties such as melt strength and impact strength. In one embodiment the present invention relates to a multilayer composite comprising, in sequence, (i) optionally, an outer layer comprising an acrylic resin which is substantially transparent to visible light, (ii) a second layer comprising a first rubber modified thermoplastic resin which is substantially transparent to visible light, and at least one additive to provide a special visual effect; (iii) a third layer comprising a light-blocking layer; (iv) a fourth layer comprising a second rubber modified thermoplastic resin different from said first rubber modified thermoplastic resin; (v) optionally, a fifth layer comprising a tielayer; and (vi) optionally, a substrate layer. In other embodiments the present invention relates to articles made from the composite.

34 Claims, 4 Drawing Sheets

MULTILAYER COMPOSITES WITH SPECIAL VISUAL EFFECTS

CROSS-REFERENCE TO RELATED APPLICATIONS

This application is a continuation-in-part of application Ser. No. 10/869,134, filed Jun. 16, 2004, now abandoned which is incorporated herein by reference.

BACKGROUND

The present invention relates to multilayer composites which exhibit special visual effects. In particular the composites exhibit an excellent combination of physical properties including melt strength and impact strength, while providing special visual effects and protection of underlying layers from the detrimental effects of visible and UV light.

Composite articles exhibiting special visual effects, such as colors, or a granite-like or a metallic sparkle appearance, are continually in demand for commercial applications. Such visual effects may often be introduced into a composite by using a suitable special visual effect additive dispersed in a resinous matrix in a single layer of the composite. However, achievement of a special visual effect often requires excessive loading of additive which may detrimentally affect the physical properties of the entire composite. In some examples low melt strength or low impact strength makes the composite difficult to process and unsuitable for its final desired use. Also, the addition of a rubbery impact modifier to the special effects layer, while improving impact strength, adversely affects the desired visual effects. Adequate melt and impact strength may be provided by a separate layer underneath the said special visual effects layer, but materials providing such beneficial properties are often degraded by visible and/or ultraviolet light which may be transmitted through the substantially transparent special visual effects layer. A problem to be solved is to provide multilayer composites which exhibit special visual effects while also maintaining other physical properties such as impact strength, and also while providing protection of underlying layers from degradation by visible and/or ultraviolet light. A further problem to be solved is to provide multilayer composites which are easily manufactured, for example by exhibiting suitable melt strength.

Figure 1:
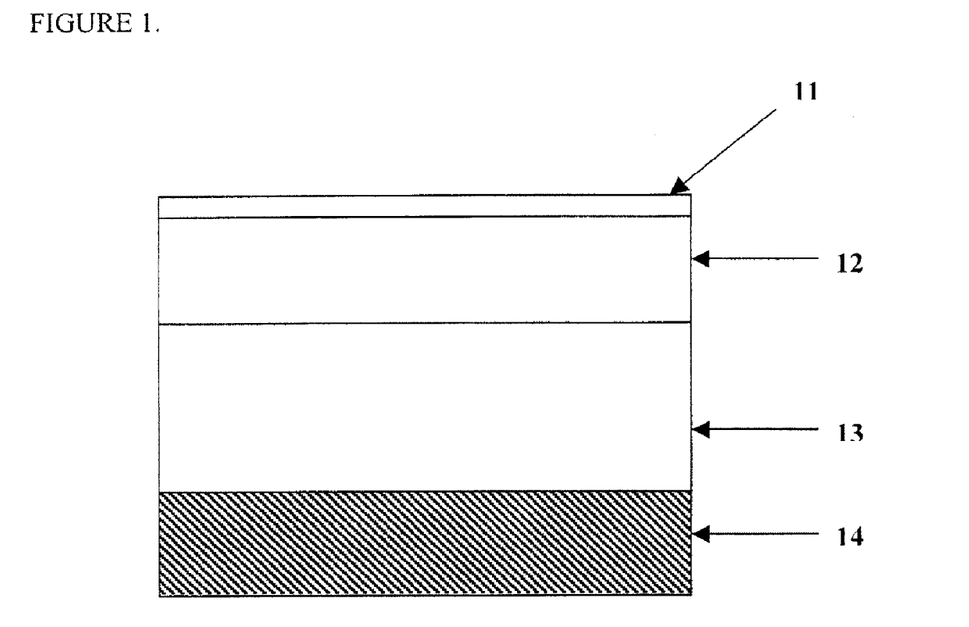
FIG. 1 shows a schematic representation of a multilayer composite in accordance with the prior art.

FIG. 1 shows the structure of a multilayer composite that is known in the art. The composite has four layers, an outer or first layer 11 which comprises an acrylic resin; a second layer 12 which is formed from an amorphous acrylonitrile-styrene-acrylate graft copolymer (ASA); a third layer 13 comprising acrylonitrile-butadiene-styrene graft copolymer (ABS); and a fiber-reinforced polymer substrate 14. Material consisting of layers 11, 12 and 13 is marketed in sheet form under the tradename Weather-Pro G by Spartech Corporation, and the sheets of material are thermoformed into boat hulls and other shapes to be the outer skin on fiber reinforced polymer substrate 14. However, special visual effects are difficult to achieve since the ASA layer must serve the purpose of both special effects layer and light-blocking layer.

Commonly owned U.S. Pat. No. 7,135,233 describes multilayer composites comprising an outer layer comprising an acrylic resin, a second layer comprising an acrylonitrile-styrene-acrylate graft copolymer; a third layer comprising a modified ABS graft copolymer; and optionally a fourth layer comprising an acrylic resin. The modified ABS polymer comprises both an acrylonitrile-styrene-acrylate graft copolymer and a polymer modifier that decreases the softening of the ABS on contact with styrene. The requirement for ABS containing resinous modifiers increases the complexity of manufacturing the composite and limits its applications.

BRIEF DESCRIPTION

The present inventors have discovered multilayer composites which display both special visual effects and also a beneficial combination of other properties. In one embodiment the present invention relates to a multilayer composite comprising, in sequence, (i) optionally, an outer layer comprising an acrylic resin which is substantially transparent to visible light, (ii) a second layer comprising a first rubber modified thermoplastic resin which is substantially transparent to visible light, and at least one additive to provide a special visual effect; (iii) a third layer comprising a light-blocking layer; (iv) a fourth layer comprising a second rubber modified thermoplastic resin different from said first rubber modified thermoplastic resin; (v) optionally, a fifth layer comprising a tielayer; and (vi) optionally, a substrate layer.

In other embodiments the present invention relates to articles made from the composite. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The terminology "monoethylenically unsaturated" means having a single site of ethylenic unsaturation per molecule. The terminology "polyethylenically unsaturated" means having two or more sites of ethylenic unsaturation per molecule. The terminology "(meth)acrylate" refers collectively to acrylate and methacrylate; for example, the term "(meth)acrylate monomers" refers collectively to acrylate monomers and methacrylate monomers. The term "(meth)acrylamide" refers collectively to acrylamides and methacrylamides. The term "polycarbonate"

refers to polycarbonates comprising structural units derived from a carbonate precursor and at least one dihydroxy-substituted aromatic hydrocarbon. The term "polycarbonate" encompasses both "homopolycarbonate" which refers to a polycarbonate synthesized using only one type of dihydroxy-substituted aromatic hydrocarbon; and "copolycarbonate" which refers to a polycarbonate synthesized using more than one type of dihydroxy-substituted hydrocarbon, and in particular more than one type of dihydroxy-substituted aromatic hydrocarbon.

The term "alkyl" as used in the various embodiments of the present invention is intended to designate linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. Alkyl groups may be saturated or unsaturated, and may comprise, for example, vinyl or allyl. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl. Some illustrative non-limiting examples of alkyl groups comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals containing from 6 to 20 ring carbon atoms. Some illustrative non-limiting examples of these aryl radicals include $C_6$-$C_{20}$ aryl optionally substituted with one or more groups selected from $C_1$-$C_{32}$ alkyl, $C_3$-$C_{15}$ cycloalkyl, aryl, functional groups comprising atoms selected from Groups 15, 16 and 17 of the Periodic Table, and mixtures thereof. Some particular illustrative examples of aryl radicals comprise substituted or unsubstituted phenyl, biphenyl, tolyl, naphthyl and binaphthyl.

Figure 2A:
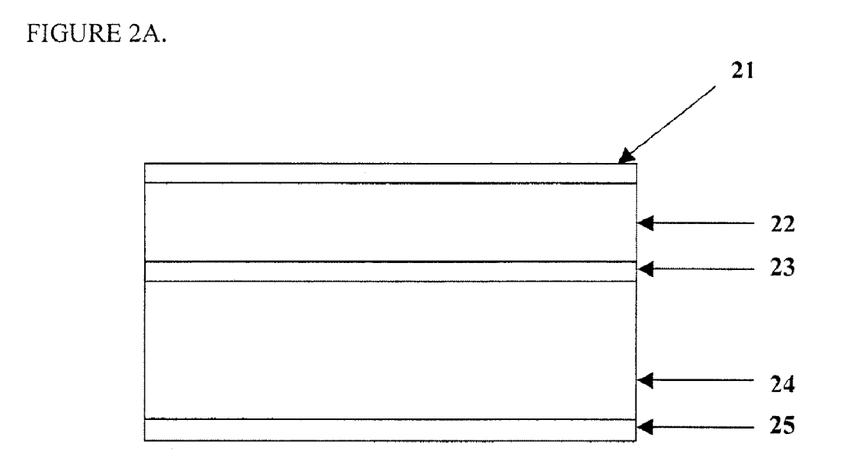
FIG. 2A shows a schematic representation of a multilayer composite in an embodiment of the invention.
Figure 2B:
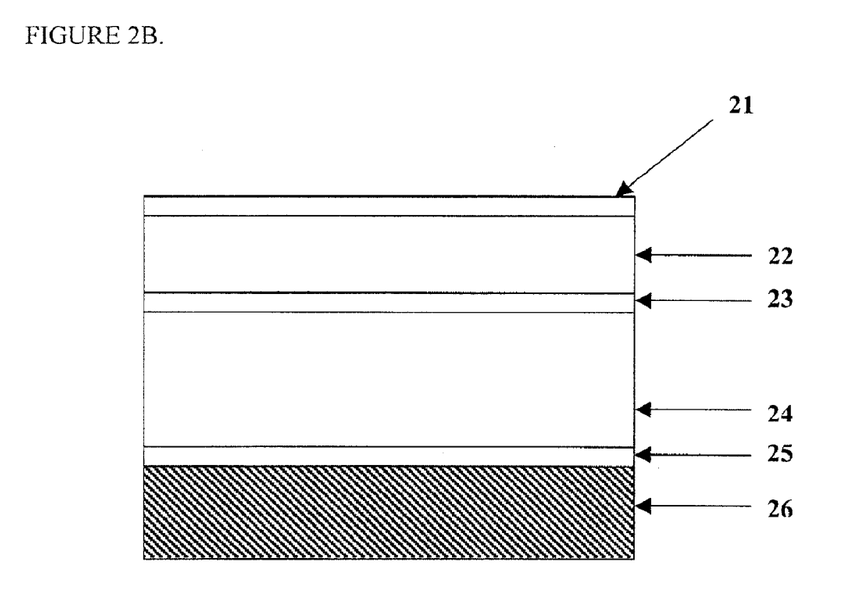
FIG. 2B shows a schematic representation of a multilayer composite in an embodiment of the invention after application to a fiber reinforced substrate.

FIG. 2A shows a schematic representation of a multilayer composite in an embodiment of the present invention. The composite comprises the following layers: (i) an optional outer or first layer 21 comprising an acrylic resin; (ii) a second layer 22 comprising a first rubber modified thermoplastic resin; (iii) a third layer 23 comprising a light-blocking layer; (iv) a fourth layer 24 comprising a second rubber modified thermoplastic resin different from said first rubber modified thermoplastic resin; and (v) an optional fifth layer 25 comprising a tielayer. The said first layer, when present, is substantially transparent to visible light. The said second layer is substantially transparent to visible light and may comprise special visual effect additives. The light-blocking layer is substantially opaque to visible light. In some particular embodiments the light-blocking layer retards light-induced degradation of the fourth layer. In various embodiments at least one layer overlying said fourth layer is substantially opaque to ultraviolet (UV) light. In a particular embodiment the first layer comprising an acrylic resin is substantially opaque to UV light. In another particular embodiment the third layer comprising the light-blocking layer is substantially opaque to UV light. In another particular embodiment the first and third layers of the composite together are substantially opaque to UV light. When present, the fifth layer comprising a tielayer joins the composite to a substrate. FIG. 2B shows a schematic representation of the multilayer composite of FIG. 2A applied to a fiber-reinforced substrate 26 (wherein the reference numbers 21-25 have the same meaning as for FIG. 2A). The layers depicted in FIGS. 2A and 2B may comprise relative thicknesses other than those implied by the figure.

Multilayer composites of the present invention optionally comprise at least one outer layer (sometimes referred to as a coating) comprising an acrylic resin. The outer layer is sometimes referred to as the first layer of the multilayer composite. In some embodiments the outer layer may impart an acceptable gloss value to the surface of the composite. Optionally, the acrylic resin of the outer layer, when present, may further comprise at least one ultraviolet light stabilizer (sometimes referred to herein as a UV stabilizer or UV absorber). In particular embodiments the outer layer is present and consists essentially of at least one UV-stabilized acrylic resin. UV-stabilized acrylic resins have been used in outdoor applications for some time, for example as described in U.S. Pat. Nos. 4,556,606, 3,582,398, 4,178,303, 4,260,768 and 4,310,650. Suitable acrylic resins include, but are not limited to, thermoplastic acrylic resins and thermosetting acrylic resins.

The thermoplastic acrylic resins which may be employed herein are well known in the art. Exemplary thermoplastic acrylic resins are set forth, for example, in Encyclopedia of Polymer Science and Technology, Vol. 1, Interscience Publishers, John Wiley and Sons, Inc., 1964 at page 246 et seq., and the references cited therein. The term "thermoplastic acrylic resins" as used herein is meant to embrace within its scope those thermoplastic resins resulting from the polymerization of one or more (meth)acrylic acid ester monomers. These monomers are represented by the general formula $CH_2=CYCOOR^1$ wherein Y is hydrogen or a methyl radical and $R^1$ is an alkyl radical, preferably an alkyl radical containing from 1 to about 20 carbon atoms. Some nonlimiting examples of acrylic acid ester monomers include methyl acrylate, isopropyl acrylate, n-propyl acrylate, n-butyl acrylate, isobutyl acrylate, 2-ethylhexyl acrylate, and the like. Some nonlimiting examples of methacrylic acid ester monomers include methyl methacrylate, ethyl methacrylate, butyl methacrylate, hexyl methacrylate, isobutyl methacrylate, propyl methacrylate, and the like. Copolymers of the above acrylate and methacrylate monomers are also included within the term thermoplastic acrylic resins as it appears herein. Preferred thermoplastic acrylic resins are poly(methyl methacrylate) (PMMA) and copolymers thereof. The polymerization of the (meth)acrylic acid esters monomers to provide the thermoplastic acrylic resins may be accomplished by any of the well-known polymerization techniques. In some embodiments the thermoplastic acrylic resins having a weight average molecular weight of at least about 15,000 are generally preferred in the practice of the instant invention.

The thermoplastic acrylic resins useful as coatings include acrylic homopolymers derived from a single type of acrylic acid ester monomer; methacrylic homopolymers derived from a single type of methacrylic acid ester monomer and copolymers derived from two or more different acrylic acid ester monomers, two or more different methacrylic acid ester monomers, or an acrylic acid ester monomer and a methacrylic acid ester monomer. Mixtures of two or more of the aforedescribed thermoplastic acrylic resins, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, can also be used.

In some embodiments the outer layer comprises a rubber modified thermoplastic acrylic resin. Optionally the rubber modified acrylic resin further comprises at least one ultraviolet light stabilizer. Suitable rubber modified thermoplastic acrylic resins comprise a rubber modified poly(methyl methacrylate) resin. Illustrative, non-limiting examples of rubber modified poly(methyl methacrylate) resins comprise those modified with a rubber comprising structural units derived from one or more alkyl acrylate monomers, such as but not limited to, poly(butyl acrylate). In some particular embodiments suitable rubber modified thermoplastic acrylic resins comprise a poly(methyl methacrylate) modified with about 60% poly(butyl acrylate) available from Arkema as PLEXIGLAS® DR-101. Additional rubber modified acrylic resins comprise SOLARKOTE® grades available from Arkema and ACRYLITE® grades available from Cyro Industries. Further rubber modified thermoplastic acrylic resins include, but are not limited to, rubber modified acrylic resins sold under the trademarks XT® and CYROLITE® by Cyro Industries, Mount Arlington, N.J. Other illustrative examples of rubber modified thermoplastic acrylic resins are taught, for example, in U.S. Pat. Nos. 4,228,256 and 5,290,860.

Suitable coatings also include thermoplastic acrylic resins containing functional groups, as described, for example, in U.S. Pat. Nos. 3,968,305 and 3,968,309. The term "thermoplastic acrylic resin containing functional groups" as used herein is meant to embrace within its scope those thermoplastic resins resulting from the polymerization of one or more substituted (meth)acrylic acid ester monomers represented by the general formula $CH_2=CY-COOR^2Z$ wherein Y is hydrogen or a methyl radical; $R^2$ is a divalent saturated aliphatic hydrocarbon radical; and Z is a hydroxyl, carboxyl, amine, epoxide, amide, SH, $SO_3H$, $COOR^3$, or $Si(OR^4)_3$ group, wherein $R^3$ and $R^4$ are alkyl groups, preferably alkyl groups containing from 1 to about 20 carbon atoms. $R^2$ is preferably a divalent saturated aliphatic hydrocarbon radical containing from 1 to about 20 carbon atoms. Copolymers resulting from the copolymerization of at least two substituted (meth)acrylic acid ester monomers are also included within the term thermoplastic acrylic resin containing functional groups. Also included within this term are copolymers resulting from the copolymerization of at least one substituted (meth)acrylic acid ester monomer with at least one (meth)acrylic acid ester monomer represented by the general formula $CH_2=CYCOOR^1$ wherein Y is hydrogen or a methyl radical and $R^1$ is an alkyl radical. Some nonlimiting examples of (meth)acrylic acid ester monomers of this type which can be copolymerized with the substituted acrylic or methacrylic acid ester monomers to form the thermoplastic acrylic resins containing functional groups include methyl acrylate, ethyl acrylate, butyl acrylate, 2-ethylhexylacrylate, methyl methacrylate, ethyl methacrylate, butyl methacrylate, hexyl methacrylate, and the like. Examples of copolymers of this type include copolymers obtained by the copolymerization of ethyl methacrylate and hydroxyethyl methacrylate, ethyl methacrylate and gamma-methacryloxypropyltrimethoxysilane, methyl acrylate and hydroxyethyl acrylate, and the like. The polymerization of substituted (meth)acrylate monomers to provide the thermoplastic acrylic resin containing functional groups useful in the practice of the present invention may be accomplished by any of the well known polymerization techniques. In some embodiments the thermoplastic acrylic resins containing functional groups have a weight average molecular weight of at least about 20,000 and preferably at least about 50,000.

The term thermoplastic acrylic resin containing functional groups includes homopolymers obtained from the polymerization of a substituted (meth)acrylic ester monomer; copolymers obtained from the copolymerization of at least two substituted acrylic acid ester monomers; copolymers obtained from the copolymerization of at least two substituted methacrylic acid ester monomers; copolymers obtained from the copolymerization of at least one substituted acrylic acid ester monomer and at least one substituted methacrylic acid ester monomer; copolymers obtained by the copolymerization of at least one substituted acrylic acid ester monomer and at least one methacrylic acid ester monomer; copolymers obtained by the copolymerization of at least one substituted acrylic acid ester monomer and at least one acrylic acid ester monomer; copolymers obtained by the copolymerization of at least one substituted methacrylic acid ester monomer and at least one acrylic acid ester monomer; and copolymers obtained by the copolymerization of at least one substituted methacrylic acid ester monomer and at least one methacrylic acid ester monomer. Mixtures of two or more of these homopolymers or copolymers comprising the thermoplastic acrylic resin with or without functional groups can also be used in the practice of the present invention. In a particular embodiment a suitable acrylic resin comprises resin sold under the name V-826 available from Atofina.

Exemplary, nonlimiting, thermosetting acrylic resins which may be employed in the practice of this invention are disclosed, for example, in Encyclopedia of Polymer Science and Technology, Vol. 1, Interscience Publishers, John Wiley & Sons, Inc., 1964, at page 273 et seq., and in Chemistry of Organic Film Formers, by D. H. Solomon, John Wiley and Sons, Inc., 1967, at page 251 et seq., and the references cited therein. These thermosetting acrylic resins generally include: (a) acrylic copolymers having reactive functional groups which are capable of reacting between themselves to effect a cross-linkage thereof; (b) acrylic copolymers having reactive functional groups to which there is added an appropriate cross-linking agent which will react with the functional groups to effect cross-linking; and (c) a mixture of two polymers having cross-linkable functional reactive groups.

Typically, the reactions involved in cross-linking the thermosetting acrylic polymers are reactions between, for example: epoxide functional groups and amine functional groups; epoxide functional groups and acid anhydride functional groups; epoxide functional groups and acidic functional groups, such as carboxyl and/or phenolic hydroxyl groups; epoxide functional groups and N-methylol or N-methylol-ether functional groups; carboxyl functional groups and N-methylol or N-methylol-ether functional groups; carboxyl functional groups and isocyanate groups; hydroxyl groups, for example polyols, and isocyanate groups; and amine groups and N-methylol or N-methylol-ether functional groups. In the usual case of resin mixtures, the acrylic will be present in a major proportion, i.e., greater than 50 wt. % and, more typically, will be present in an amount in excess of about 70 wt. %. The needed functional group in the acrylic copolymer, which is the foundation of the thermosetting acrylic polymer, is provided by employing in the mixture a monomer which supplies the needed reactive functional group into the polymer chain. Usually, this copolymerizable functional group-supplying monomer will be present in small amounts, that is, on the order of 25 wt. % or less, and typically, between about 1 and 20 wt. % of the monomer mass which is polymerized. Some non-limiting examples of these functional group supplying monomers include glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleimide, N-methylolmethacrylamide, vinyl isocyanate, allyl isocyanate, and the like. Usually the other monomer which will be polymerized along with the monomer supplying the functional group is a lower ($C_1$-$C_3$)alkyl acrylic ester or mixtures thereof, e.g., methyl acrylate, ethyl acrylate, methyl methacrylate, ethyl methacrylate, styrene, or mixtures thereof, in an amount ranging between about 75 parts by weight to about 99 parts by weight and, more typically, between about 80 parts by weight to about 97 parts by weight. When present, the said outer layer has a thickness in one embodiment in a range of between about 0.05 mm and about 2 mm, in another embodiment in a range of between about 0.1 mm and about 1 mm, in another embodiment in a range of between about 0.1 mm and about 0.8 mm, and in another embodiment in a range of between about 0.2 mm and about 0.6 mm.

When present, suitable UV stabilizers for use in said outer layer include, but are not limited to, oxanilides, hydroxybenzophenones, hydroxyphenyl-s-triazines, benzotriazoles, and the like which may be copolymerized or blended with the acrylic resin. Commercially available benzotriazole UV absorbers include TINUVIN® 234, MIXXI® BB/200, and CYASORB® 5411. Benzophenone derivatives and benzotriazole derivatives are disclosed in U.S. Pat. Nos. 3,309,220; 3,049,443; 3,043,709; 3,214,436; 2,976,259 and U.S. Re. Pat. No. 2,976. Some non-limiting examples of these compounds include: 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-methoxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiarybutylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4-,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; 2-(2'-hydroxy-5'-methylphenyl)-benzotriazole; 2-(2'-hydroxy-5'-tert-butylphenyl)-benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chlorobenzotriazole; 2-(2'-hydroxy-3'-di-tert-butylphenyl-benzotriazole, and the like.

The amount of ultraviolet light stabilizer optionally present in the said outer layer is in one embodiment an effective amount to prevent substantially all or at least a portion of UV light from transmission through the layer. In one particular embodiment, an effective amount of ultraviolet light stabilizer is that amount wherein the absorbance of the ultraviolet light stabilizer at lambda (λ) maximum is at least 1, which corresponds to absorption at λ maximum of at least 90% of the incident ultraviolet radiation by the UV stabilizer coating composition. The absorbance is calculated using the relationship A=log(Io/I) wherein A is the absorbance, Io is the intensity of incident light, and I is the intensity of transmitted light. More specifically, but not by limitation, the acrylic outer layer in the composites of the invention, when it contains a UV stabilizer, suitably contains from about 0.01 wt. % to about 5 wt. % and preferably from about 0.1 wt. % to about 3 wt. % of an ultraviolet light stabilizer, based on the weight of resinous material comprising the said outer layer. Further, the acrylic layer may contain only one ultraviolet light stabilizer or a combination of two or more ultraviolet light stabilizers. If two or more ultraviolet light stabilizers are present in the stabilizing coating compositions their combined weight percentages are generally in the range as noted above. Obviously, stabilizing compositions having higher concentrations of ultraviolet light stabilizer than stated above are useful in the practice of the present invention and are within the full intended scope of the invention as disclosed herein.

Multilayer composites of the present invention further comprise a second, third, and fourth layer. The second layer is in contact with the first or outer layer. The second and fourth layers are joined by a third layer which is a light-blocking layer interposed between said second and fourth layers. The second and fourth layers in the multilayer composites comprise, respectively, a first rubber modified thermoplastic resin and a second rubber modified thermoplastic resin different from said first rubber modified thermoplastic resin. The second layer further comprises additives which impart special visual effects to the composite. Optionally, the second layer may also provide blocking of substantially all or at least a portion of UV light from transmission through the layer. The UV light blocking effect may be present as an inherent property of the resinous component of said second layer, or as the result of an ultraviolet light stabilizer included therein, or as a result of both the resinous component and an ultraviolet light stabilizer therein. Suitable ultraviolet light stabilizers and amounts thereof comprise those given herein above in the description of the first or outer layer. The fourth layer provides in one embodiment either or both of enhanced melt strength and enhanced impact strength to the composite.

Each rubber modified thermoplastic resin of the second and fourth layers comprises a discontinuous elastomeric phase and a rigid thermoplastic phase wherein at least a portion of the rigid thermoplastic phase is grafted to the elastomeric phase. Each rubber modified thermoplastic resin employs at least one rubber substrate for grafting. The rubber substrate comprises the discontinuous elastomeric phase of the rubber modified thermoplastic resin. There is no particular limitation on the rubber substrate provided it is susceptible to grafting by at least a portion of a graftable monomer. The rubber substrate typically has a glass transition temperature, Tg, in one embodiment less than or equal to 25° C., in another embodiment below about 0° C., in another embodiment below about minus 20° C., and in still another embodiment below about minus 30° C. As referred to herein, the Tg of a polymer is the T value of polymer as measured by differential scanning calorimetry (DSC; heating rate 20° C./minute, with the Tg value being determined at the inflection point).

In one embodiment the rubber substrate is derived from polymerization by known methods of at least one monoethylenically unsaturated alkyl (meth)acrylate monomer selected from $(C_1-C_{12})$alkyl(meth)acrylate monomers and mixtures comprising at least one of said monomers. As used herein, the terminology "$(C_x-C_y)$", as applied to a particular unit, such as, for example, a chemical compound or a chemical substituent group, means having a carbon atom content of from "x" carbon atoms to "y" carbon atoms per such unit. For example, "$(C_1-C_{12})$alkyl" means a straight chain, branched or cyclic alkyl substituent group having from 1 to 12 carbon atoms per group. Suitable $(C_1-C_{12})$alkyl (meth)acrylate monomers include, but are not limited to, $(C_1-C_{12})$alkyl acrylate monomers, illustrative examples of which comprise ethyl acrylate, butyl acrylate, iso-pentyl acrylate, n-hexyl acrylate, and 2-ethyl hexyl acrylate, and the like; and their $(C_1-C_{12})$alkyl methacrylate analogs illustrative examples of which comprise methyl methacrylate, ethyl methacrylate, propyl methacrylate, iso-propyl methacrylate, butyl methacrylate, hexyl methacrylate, decyl methacrylate, and the like. In a particular embodiment of the present invention the rubber substrate comprises structural units derived from n-butyl acrylate.

In another embodiment, the rubber substrate is derived from polymerization by known methods of at least one unsaturated monomer selected from conjugated diene monomers, non-conjugated diene monomers and $(C_1-C_{12})$ alkyl (meth)acrylate monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4, hexadiene, dichlorobutadiene, bromobutadiene, dibromobutadiene, and the like, as well as mixtures of conjugated diene monomers. In a particular embodiment, the conjugated diene monomer is 1,3-butadiene. Suitable non-conjugated diene monomers include, e.g., ethylidene norbornene, dicyclopentadiene, hexadiene, phenyl norbornene, and the like, and mixtures thereof In various embodiments the rubber substrate may also comprise a minor amount, for example up to about 5 wt. %, of structural units derived from at least one polyethylenically unsaturated monomer, for example those that are copolymerizable with a monomer used to prepare the rubber substrate. A polyethylenically unsaturated monomer is often employed to provide cross-linking of the rubber particles and/or to provide "graftlinking" sites in the rubber substrate for subsequent reaction with grafting monomers. Suitable polyethylenically unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylcyanurate, triallylisocyanurate, the acrylate of tricyclodecenylalcohol, and the like, and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those that are copolymerizable with a monomer used to prepare the rubber substrate. In particular embodiments the rubber substrate may optionally include up to about 25 wt. % of structural units derived from one or more monomers selected from $(C_2-C_8)$olefin monomers, (meth)acrylate monomers, vinyl aromatic monomers and monoethylenically unsaturated nitrile monomers. As used herein, the term "$(C_2-C_8)$olefin monomers" means a compound having from 2 to 8 carbon atoms per molecule and having a single site of ethylenic unsaturation per molecule. Suitable $(C_2-C_8)$olefin monomers include, but are not limited to, ethylene, propene, 1-butene, 1-pentene, heptene, and the like. Suitable copolymerizable (meth)acrylate monomers include, but are not limited to, $C_1-C_{12}$ aryl or haloaryl substituted acrylate, $C_1-C_{12}$ aryl or haloaryl substituted methacrylate, or mixtures thereof; monoethylenically unsaturated carboxylic acids, such as, for example, acrylic acid, methacrylic acid and itaconic acid; glycidyl (meth)acrylate, hydroxy alkyl (meth) acrylate, hydroxy($C_1-C_{12}$)alkyl (meth)acrylate, such as, for example, hydroxyethyl methacrylate; $(C_4-C_{12})$cycloalkyl (meth)acrylate monomers, such as, for example, cyclohexyl methacrylate; (meth)acrylamide monomers, such as, for example, acrylamide, methacrylamide and N-substituted-acrylamide or N-substituted-methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. Suitable vinyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, alpha-chloro acrylonitrile, and the like.

In a particular embodiment the rubber substrate comprises from 60 wt. % to 100 wt. % repeating units derived from one or more conjugated diene monomers and from 0 wt. % to 40 wt. % repeating units derived from one or more monomers selected from vinyl aromatic monomers and monoethylenically unsaturated nitrile monomers, such as, for example, a poly(butadiene), a styrene-butadiene copolymer, an acrylonitrile-butadiene copolymer or a styrene-butadiene-acrylonitrile copolymer. In another particular embodiment the rubber substrate comprises from 70 wt. % to 90 wt. % repeating units derived from one or more conjugated diene monomers and from 30 wt. % to 10 wt. % repeating units derived from one or more monomers selected from vinyl aromatic monomers. In another particular embodiment the rubber substrate comprises repeating units derived from one or more ($C_1$-$C_{12}$)alkyl acrylate monomers. In still another particular embodiment, the rubber substrate comprises from 40 wt. % to 95 wt. % repeating units derived from one or more ($C_1$-$C_{12}$)alkyl acrylate monomers, more preferably from one or more monomers selected from ethyl acrylate, butyl acrylate and n-hexyl acrylate.

The rubber substrate may be present independently in each of the first and second rubber modified thermoplastic resins in one embodiment at a level of from about 4 wt. % to about 94 wt. %; in another embodiment at a level of from about 10 wt. % to about 80 wt. %; in another embodiment at a level of from about 15 wt. % to about 80 wt. %; in another embodiment at a level of from about 35 wt. % to about 80 wt. %; in another embodiment at a level of from about 40 wt. % to about 80 wt. %; in another embodiment at a level of from about 25 wt. % to about 60 wt. %, and in still another embodiment at a level of from about 40 wt. % to about 50 wt. %, based on the weight of the particular rubber modified thermoplastic resin. In other embodiments the rubber substrate may be present in the rubber modified thermoplastic resin at a level of from about 5 wt. % to about 50 wt. %; at a level of from about 8 wt. % to about 40 wt. %; or at a level of from about 10 wt. % to about 30 wt. %, based on the weight of the particular rubber modified thermoplastic resin.

There is no particular limitation on the particle size distribution of the rubber substrate (sometimes referred to hereinafter as initial rubber substrate to distinguish it from the rubber substrate following grafting). In some embodiments the initial rubber substrate may possess a broad particle size distribution with particles ranging in size from about 50 nm to about 1000 nm. In other embodiments the mean particle size of the initial rubber substrate may be less than about 100 nm. In still other embodiments the mean particle size of the initial rubber substrate may be in a range of between about 80 nm and about 500 nm. In still other embodiments the mean particle size of the initial rubber substrate may be in a range of between about 200 nm and about 750 nm. In other embodiments the mean particle size of the initial rubber substrate may be greater than about 400 nm. In still other embodiments the initial rubber substrate comprises particles which are a mixture of particle sizes with at least two mean particle size distributions. In a particular embodiment the initial rubber substrate comprises particles which are a mixture of particle sizes with two mean particle size distributions each in a range of between about 80 nm and about 500 nm.

The rubber substrate may be made according to known methods. In one non-limiting embodiment the rubber substrate is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan and coagulated to form particles of rubber substrate.

The rigid thermoplastic resin phase of each rubber modified thermoplastic resin comprises one or more thermoplastic polymers. In one embodiment of the present invention monomers are polymerized in the presence of the rubber substrate to thereby form a rigid thermoplastic phase, at least a portion of which is chemically grafted to the elastomeric phase. The portion of the rigid thermoplastic phase chemically grafted to rubber substrate is sometimes referred to hereinafter as grafted copolymer. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of ($C_1$-$C_{12}$)alkyl-(meth)acrylate monomers, aryl-(meth)acrylate monomers, vinyl aromatic monomers and monoethylenically unsaturated nitrile monomers. Suitable ($C_1$-$C_{12}$) alkyl-(meth)acrylate and aryl-(meth)acrylate monomers, vinyl aromatic monomers and monoethylenically unsaturated nitrile monomers include those set forth hereinabove in the description of the rubber substrate. In addition, the rigid thermoplastic resin phase may, provided that the Tg limitation for the phase is satisfied, optionally include up to about 10 wt. % of third repeating units derived from one or more other copolymerizable monomers.

The rigid thermoplastic phase typically comprises one or more vinyl aromatic polymers. Suitable vinyl aromatic polymers comprise at least about 20 wt. % structural units derived from one or more vinyl aromatic monomers. In one embodiment the rigid thermoplastic phase comprises a vinyl aromatic polymer having first structural units derived from one or more vinyl aromatic monomers and having second structural units derived from one or more monoethylenically unsaturated nitrile monomers. Examples of such vinyl aromatic polymers include, but are not limited to, styrene/ acrylonitrile copolymers, alpha-methylstyrene/acrylonitrile copolymers, or alpha-methylstyrene/styrene/acrylonitrile copolymers. In another particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of ($C_1$-$C_{12}$) alkyl- and aryl-(meth)acrylate monomers. Examples of such vinyl aromatic polymers include, but are not limited to, styrene/acrylonitrile/methyl methacrylate copolymers, alpha-methylstyrene/acrylonitrile/methyl methacrylate copolymers and alpha-methylstyrene/styrene/acrylonitrile/ methyl methacrylate copolymers. Further examples of suitable vinyl aromatic polymers comprise styrene/methyl methacrylate copolymers, styrene/maleic anhydride copolymers; styrene/acrylonitrile/maleic anhydride copolymers, and styrene/acrylonitrile/acrylic acid copolymers. These copolymers may be used for the rigid thermoplastic phase either individually or as mixtures.

When structural units in copolymers are derived from one or more monoethylenically unsaturated nitrile monomers, then the amount of nitrile monomer added to form the copolymer comprising the grafted copolymer and the rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the total weight of monomers added to form the copolymer comprising the grafted copolymer and the rigid thermoplastic phase.

When structural units in copolymers are derived from one or more ($C_1$-$C_{12}$)alkyl- and aryl-(meth)acrylate monomers, then the amount of the said monomer added to form the copolymer comprising the grafted copolymer and the rigid thermoplastic phase may be in one embodiment in a range of between about 5 wt. % and about 50 wt. %, in another embodiment in a range of between about 5 wt. % and about 45 wt. %, in another embodiment in a range of between about 10 wt. % and about 35 wt. %, and in yet another embodiment in a range of between about 15 wt. % and about 35 wt. %, based on the total weight of monomers added to form the copolymer comprising the grafted copolymer and the rigid thermoplastic phase.

The amount of grafting that takes place between the rubber substrate and monomers comprising the rigid thermoplastic phase varies with the relative amount and composition of the rubber phase. In one embodiment, greater than about 10 wt. % of the rigid thermoplastic phase is chemically grafted to the rubber, based on the total amount of rigid thermoplastic phase in the particular rubber modified thermoplastic resin. In another embodiment, greater than about 15 wt. % of the rigid thermoplastic phase is chemically grafted to the rubber, based on the total amount of rigid thermoplastic phase in the particular rubber modified thermoplastic resin. In still another embodiment, greater than about 20 wt. % of the rigid thermoplastic phase is chemically grafted to the rubber, based on the total amount of rigid thermoplastic phase in the particular rubber modified thermoplastic resin. In particular embodiments the amount of rigid thermoplastic phase chemically grafted to the rubber may be in a range of between about 5 wt. % and about 90 wt. %; between about 10 wt. % and about 90 wt. %; between about 15 wt. % and about 85 wt. %; between about 15 wt. % and about 50 wt. %; or between about 20 wt. % and about 50 wt. %, based on the total amount of rigid thermoplastic phase in the particular rubber modified thermoplastic resin. In yet other embodiments, about 40 wt. % to 90 wt. % of the rigid thermoplastic phase is free, that is, non-grafted.

The rigid thermoplastic phase may be present in each rubber modified thermoplastic resin independently in one embodiment at a level of from about 85 wt. % to about 6 wt. %; in another embodiment at a level of from about 65 wt. % to about 6 wt. %; in another embodiment at a level of from about 60 wt. % to about 20 wt. %; in another embodiment at a level of from about 75 wt. % to about 40 wt. %, and in still another embodiment at a level of from about 60 wt. % to about 50 wt. %, based on the weight of the particular rubber modified thermoplastic resin. In other embodiments rigid thermoplastic phase may be present in a range of between about 90 wt. % and about 30 wt. %, based on the weight of the particular rubber modified thermoplastic resin.

The rigid thermoplastic phase may be formed solely by polymerization carried out in the presence of rubber substrate, or by addition of one or more separately synthesized rigid thermoplastic polymers to the particular rubber modified thermoplastic resin, or by a combination of both processes. In some embodiments the separately synthesized rigid thermoplastic polymer comprises structural units essentially identical to those of the rigid thermoplastic phase comprising the particular rubber modified thermoplastic resin. In some particular embodiments separately synthesized rigid thermoplastic polymer comprises at least one of styrene-acrylonitrile copolymer or styrene-acrylonitrile-methyl methacrylate copolymer. When at least a portion of separately synthesized rigid thermoplastic polymer is added to the particular rubber modified thermoplastic resin, then the amount of said separately synthesized rigid thermoplastic polymer added is in an amount in a range of between about 5 wt. % and about 80 wt. % based on the weight of the particular rubber modified thermoplastic resin. Two or more different rubber substrates, each possessing a different mean particle size, may be separately employed in a polymerization reaction to prepare rigid thermoplastic phase, and then the products blended together. In illustrative embodiments wherein such products each possessing a different mean particle size of initial rubber substrate are blended together, then the ratios of said substrates may be in a range of about 90:10 to about 10:90, or in a range of about 80:20 to about 20:80, or in a range of about 70:30 to about 30:70. In some embodiments an initial rubber substrate with smaller particle size is the major component in such a blend containing more than one particle size of initial rubber substrate.

The rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631; and in U.S. patent application Ser. No. 08/962,458, filed Oct. 31, 1997. The unsaturated sites in the rubber phase are provided, for example, by residual unsaturated sites in those structural units of the rubber that were derived from a graftlinking monomer. In some embodiments of the present invention monomer grafting to rubber substrate with concomitant formation of rigid thermoplastic phase may optionally be performed in stages wherein at least one first monomer is grafted to rubber substrate followed by at least one second monomer different from said first monomer. Representative procedures for staged monomer grafting to rubber substrate include, but are not limited to, those taught in commonly assigned U.S. patent application Ser. No. 10/748,394, filed Dec. 30, 2003.

In a preferred embodiment said first rubber modified thermoplastic resin comprising the second layer in multilayer composites of the invention is an acrylonitrile-styrene-acrylate (ASA) graft copolymer such as that manufactured and sold by General Electric Company under the trademark GELOY®, and preferably an acrylate-modified acrylonitrile-styrene-acrylate graft copolymer. ASA polymeric materials include, for example, those disclosed in U.S. Pat. No. 3,711,575. Acrylonitrile-styrene-acrylate graft copolymers are described in commonly assigned U.S. Pat. Nos. 4,731,414 and 4,831,079. In some embodiments of the invention where an acrylate-modified ASA is used, the ASA component further comprises an additional acrylate-graft formed from monomers selected from the group consisting of $C_1$ to $C_{12}$ alkyl- and aryl-(meth)acrylate as part of either the rigid phase, the rubber phase, or both. Such copolymers are referred to as acrylate-modified acrylonitrile-styrene-acrylate graft copolymers, or acrylate-modified ASA. A preferred monomer is methyl methacrylate to result in a PMMA-modified ASA. The said second layer has a thickness in one embodiment in a range of between about 0.1 mm and about 8 mm, in another embodiment in a range of between about 0.2 mm and about 7 mm, in another embodiment in a range of between about 0.5 mm and about 6 mm, and in another embodiment in a range of between about 0.5 mm and about 5 mm.

In a preferred embodiment said second rubber modified thermoplastic resin comprising the fourth layer in multilayer composites of the invention comprises an ABS resin or a modified ABS resin, wherein the term "ABS" denotes a copolymer comprising structural units derived from acrylonitrile, butadiene and styrene. A great many of these copolymers are widely available commercially, or may be prepared according to any of a variety of known polymerization techniques. Typical methods for preparing traditional ABS copolymers from styrene and acrylonitrile are found, for example, in U.S. Pat. No. 3,238,275. The proportion of vinyl aromatic monomer, monoethylenically unsaturated nitrile monomer, and rubber substrate employed will depend in part on the characteristics desired in the ABS resin. In some embodiments it is preferred that the ABS copolymer comprise structural units derived from at least 40% by weight of a combination of a vinyl aromatic monomer and a monoethylenically unsaturated nitrile monomer, and 60% or less by weight of a rubber substrate. More preferably, the ABS copolymer comprises structural units derived from at least 50% by weight of a combination of a vinyl aromatic monomer and a monoethylenically unsaturated nitrile monomer, and 50% or less by weight of a rubber substrate. Also included in the invention as ABS copolymers are ABS-type resins prepared by blending an ABS copolymer having a high rubber substrate content with a preformed rigid copolymer, such as a styrene-acrylonitrile copolymer (SAN), an acrylonitrile-alpha-methylstyrene, a styrene copolymer or the like. Modified ABS-type resins prepared by blending an ABS copolymer with ASA and a polymer modifier that decreases the softening of the ABS are also included in the invention. Illustrative examples of suitable modified ABS resins are those comprising 7 to 93 wt. % and preferably 50 to 80 wt. % ABS; 0.5 to 30 wt. %, preferably 5 to 20% acrylonitrile-styrene-acrylate; and 5 to 70 wt. %, preferably 5 to 40 wt. % of modifying polymer, wherein the modifying polymer comprises a polyacrylate such as PMMA, a polycarbonate, a thermoplastic polyester, a polyolefin, or mixtures thereof. The said fourth layer has a thickness in one embodiment in a range of between about 0.2 mm and about 15 mm, in one embodiment in a range of between about 0.2 mm and about 10 mm, in another embodiment in a range of between about 0.4 mm and about 8 mm, in another embodiment in a range of between about 0.5 mm and about 6 mm, and in another embodiment in a range of between about 1 mm and about 5 mm.

Said second rubber modified thermoplastic resin present as the fourth layer of multilayer composites of the invention may optionally comprise at least one polycarbonate. Suitable polycarbonates comprise structural units derived from at least one dihydroxy aromatic hydrocarbon. In various embodiments structural units derived from at least one dihydroxy aromatic hydrocarbon comprise at least about 60 percent of the total number of structural units derived from any dihydroxy-substituted hydrocarbon in the polycarbonates, and the balance of structural units derived from any dihydroxy-substituted hydrocarbon are aliphatic, alicyclic, or aromatic radicals.

In some embodiments of the present invention, dihydroxy-substituted aromatic hydrocarbons that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, dihydroxy-substituted aromatic hydrocarbons comprise bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethylphenyl-4-hydroxyphenyl)sulfide; 3-(4-hydroxyphenyl)-1,1,3-trimethylindan-5-ol; 1-(4-hydroxyphenyl)-1,3,3-trimethylindan-5-ol; 2,2,2',2'-tetrahydro-3,3,3',3'-tetramethyl-1,1'-spirobi[1H-indene]-6,6'-diol; and the like. Mixtures comprising at least one of any of the foregoing dihydroxy-substituted aromatic hydrocarbons may also be employed. In a particular embodiment the dihydroxy-substituted aromatic hydrocarbon comprises bisphenol A.

Polycarbonates of the invention further comprise structural units derived from at least one carbonate precursor. There is no particular limitation on the carbonate precursor. Phosgene or diphenyl carbonate are frequently used. There is no particular limitation on the method for making suitable polycarbonates. Any known process may be used. In some embodiments an interfacial process or a melt transesterification process may be used.

In one embodiment of the invention the optional polycarbonate comprises at least one homopolycarbonate. In another particular embodiment the polycarbonate comprises a linear homopolycarbonate resin with structural units derived from bisphenol A. In other embodiments the polycarbonate comprises a blend of at least one first polycarbonate with at least one second polycarbonate differing from said first polycarbonate either in structural units, or in molecular weight, or in both these parameters.

When present in a layer in a composite of the present invention, the amount of polycarbonate resin is in one embodiment greater than about 25 wt. %, preferably greater than about 35 wt. %, and more preferably greater than about 40 wt. %, based on the weight of the resinous components in the layer. In another embodiment the amount of polycarbonate present in a layer in a composite of the present invention is in a range of between about 35 wt. % and about 95 wt. %, in another embodiment in a range of between about 40 wt. % and about 85 wt. %, and in still another embodiment in a range of between about 50 wt. % and about 80 wt. %, based on the weight of the resinous components in the layer.

In addition to multilayer composites comprising as the fourth layer said rubber modified thermoplastic resin such as ABS resins or their blends with such additional resins as polycarbonate, composites comprising other thermoplastic resins in place of said second rubber modified thermoplastic resin as fourth layer may be made. Illustrative examples of such equivalent thermoplastics comprise polyesters, such as poly(alkylene terephthalates), poly(alkylene naphthalates), poly(ethylene terephthalate), poly(butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), poly(1,4-cyclohexane-dimethyl-1,4-cyclohexanedicarboxylate), polyarylates, the polyarylate with structural units derived from resorcinol and a mixture of iso- and terephthalic acids, polyestercarbonates, the polyestercarbonate with structural units derived from bisphenol A, carbonic acid and a mixture of iso- and terephthalic acids, the polyestercarbonate with structural units derived from resorcinol, carbonic acid and a mixture of iso- and terephthalic acids, and the polyestercarbonate with structural units derived from bisphenol A, resorcinol, carbonic acid and a mixture of iso- and terephthalic acids; thermoplastic elastomers such as polyesters containing soft-block segments including those provided under the tradenames HYTREL®, LOMOD®, PEBAX®, PELPRENE®, and the like; and polycarbonates such as those described herein above. Representative thermoplastics also comprise aromatic polyethers such as polyarylene ether homopolymers and copolymers such as those comprising 2,6-dimethyl-1,4-phenylene ether units, optionally in combination with 2,3,6-trimethyl-1,4-phenylene ether units. Suitable aromatic polyethers also comprise polyetherimides, polyetherketones, polyetheretherketones, and polyethersulfones. Representative thermoplastics also comprise polyarylene sulfides and sulfones, such as polyphenylene sulfides, polyphenylene sulfones, and copolymers of polyphenylene sulfides with polyphenylene sulfones. Representative thermoplastics also comprise polyamides, such as poly(hexamethylene adipamide) and poly($\epsilon$-aminocaproamide). Representative thermoplastics also comprise polyolefin homopolymers and copolymers, such as polyethylene, polypropylene, copolymers containing at least one of ethylene and propylene, polyacrylates, poly(methyl methacrylate), poly(ethylene-co-acrylate)s including SURLYN, polystyrene including syndiotactic polystyrene, poly(styrene-co-acrylonitrile), and poly(styrene-co-maleic anhydride). Compatibilized blends of materials containing at least one of any of the aforementioned thermoplastic materials are also suitable. For example impact modified blends of any of the aforementioned materials may be employed, such as thermoplastic polyolefin (TPO). Illustrative blends comprise poly(phenylene ether)-polystyrene, poly(phenylene ether)-polyamide, poly(phenylene ether)-polyester, poly(butylene terephthalate)-polycarbonate, poly(ethylene terephthalate)-polycarbonate, polycarbonate-polyetherimide, and polyester-polyetherimide.

Multilayer composites of the present invention further comprise a third layer which is a light-blocking layer interposed between said second and fourth layers. There is no particular limitation on the identity of the light-blocking layer provided that it displays sufficient adhesion to adjacent layers in the composite and is substantially opaque to visible light. In the present context substantially opaque means that at least about 90% of the visible light transmitted by preceding layers is blocked by the said layer. Visible light blocking may be provided by either or both of a resinous component of said light-blocking layer and an additive (sometimes referred to as light-blocking additive) therein. The light-blocking layer may optionally provide special visual effects. In one embodiment the color of the light-blocking layer may be altered to coordinate with the color of colorants, dyes, or pigments in layers above the light-blocking layer. The light-blocking layer itself may optionally comprise visual effect pigments to enhance the overall look of the composite. Multiple substantially transparent layers containing special visual effect additives may also be used above the light-blocking layer.

In some embodiments a suitable light-blocking layer comprises a resinous component which is an acrylic resin. In other embodiments a suitable light-blocking layer comprises a resinous component identical to the resinous component present in the said second layer, and in particular identical to said first rubber modified thermoplastic resin. In some particular embodiments said light-blocking layer comprises ASA as resinous component. In a particular embodiment the light-blocking layer comprises a resinous component and an additive such as carbon black, iron oxide, a dye, a pigment, and like materials as light-blocking additive. The light-blocking layer may be derived from dilution of a concentrate of light-blocking additive in said resinous component. In an illustrative, non-limiting example, the said light-blocking layer may be derived from dilution of a concentrate comprising about 5 wt. % carbon black in poly(methyl methacrylate) modified with about 60% poly(butyl acrylate). In other particular embodiments suitable light-blocking layers comprise rubber modified acrylic resins, optionally comprising a light-blocking additive. In another particular embodiment a suitable rubber modified acrylic resin comprises poly(methyl methacrylate) modified with an acrylic rubber. In another particular embodiment a suitable rubber modified acrylic resin comprises poly(methyl methacrylate) modified with about 60% poly(butyl acrylate) available from Arkema as PLEXIGLAS®) DR-101. In another particular embodiment a suitable rubber modified acrylic resin comprises carbon black and either poly(methyl methacrylate) modified with about 60% poly(butyl acrylate) or ASA.

Optionally, the said light-blocking layer may also be substantially opaque to UV light. In the present context substantially opaque means that at least about 90% of the UV light transmitted by preceding layers is blocked by the said layer. UV light blocking may be provided by either or both of a resinous component of said light-blocking layer and an ultraviolet light stabilizer therein. When present, the amount of ultraviolet light stabilizer in said light-blocking layer is an effective amount to protect the underlying layers against degradation by ultraviolet radiation. In some embodiments the amount of ultraviolet light stabilizer is such that at least about 90%, and preferably at least about 95%, of the UV light transmitted by preceding layers is blocked by the light-blocking layer. In various embodiments the amount of optional ultraviolet light stabilizer in said light-blocking layer is in a range of between about 0.01 wt. % and about 12 wt. %, preferably in a range of between about 0.1 wt. % and about 10 wt. %, and more preferably in a range of between about 0.5 wt. % and about 8 wt. %, based on the weight of the resinous material in the said third layer. Suitable UV absorbing compounds and amounts thereof comprise those given herein above in the description of the first or outer layer.

As shown in FIGS. 2A and 2B multilayer composites of the present invention may further comprise an optional fifth layer 25 which is a tielayer in contact with the fourth layer 24 and which in some embodiments joins the multilayer composite to a substrate 26. The fourth layer 24 is between light-blocking layer 23 and the tielayer 25. The light-blocking layer 23 and the tielayer 25 may comprise the same or different resinous components. In a particular embodiment the light-blocking layer 23 and the tielayer 25 comprise the same material. There is no particular limitation on the identity of the tielayer 25 provided that it supplies adequate adhesion between the fourth layer 24 and the substrate 26. Suitable tielayer materials include, but are not limited to, rubber modified acrylic resins. In another particular embodiment a suitable rubber modified acrylic resin comprises poly(methyl methacrylate) modified with an acrylic rubber. In a particular embodiment a suitable rubber modified acrylic resin comprises poly(methyl methacrylate) modified with about 60% poly(butyl acrylate) available, for example, from Arkema as PLEXIGLAS® DR-101. Said tielayer may optionally further comprise at least one additive. In some embodiments said additive is the same as the light-blocking additive in the said light-blocking layer. In a particular embodiment a suitable tielayer comprises carbon black and poly(methyl methacrylate) modified with about 60% poly(butyl acrylate). The tielayer may be derived from dilution of a concentrate of additive in the resinous component comprising the tie layer. In one particular embodiment the said tielayer may be derived from dilution of a concentrate comprising 5 wt. % carbon black in poly(methyl methacrylate) modified with about 60% poly(butyl acrylate). When present, the said tielayer has a thickness in one embodiment in a range of between about 0.05 mm and about 2 mm, in another embodiment in a range of between about 0.1 mm and about 1 mm, in another embodiment in a range of between about 0.1 mm and about 0.8 mm, and in another embodiment in a range of between about 0.2 mm and about 0.6 mm.

Multilayer composites of the invention exhibit special visual effects through the presence of at least one special visual effect additive in at least one layer of the composite. In one embodiment the special visual effect additive is present in at least one of the first, second, or third layers. In a particular embodiment the special visual effect additive is present in the second layer as a component in the first rubber modified thermoplastic resin. The second layer may also comprise a plurality of individual layers which, upon layering, provide special visual effects that cannot be achieved by a single layer alone. Suitable special visual effect additives comprise those which provide at least one of a color, or a metallic sparkle, a metallic luster, or a metallescent effect, an angular metamerism effect, a pearlescent effect, an alliage effect, an appearance resembling stone or granite, or like effects. Illustrative special visual effect additives comprise colorants, dyes, pigments, mineral flakes, mica, glass flakes, fibers or spheres, particles of crosslinked polymer such as crosslinked acrylic resin, metal flakes, or mixtures comprising at least one of such additives. In some illustrative embodiments a single special visual effect additive, such as a dye or a colorant or mineral flakes or metallic flakes, is present. In other illustrative embodiments at least two special visual effect additives are present, such as a combination of at least one dye or colorant with at least one of mineral flakes or metallic flakes.

In a particular embodiment suitable special visual effect additives comprise mineral flakes or metallic pigment which may optionally be in the form of flakes. The metallic pigment typically has a mean particle size ranging from about 1 micron to about 3500 microns, preferably from about 1 micron to about 500 microns, preferably from about 30 microns to about 300 microns, and still more preferably from about 10 microns to about 80 microns. The preferred mineral flakes are mica flakes. Preferred metallic pigments are based on metals of Groups 4, 6, 8, 9, 10, 11, 13, and 14 of the periodic table of the elements. Examples of these metallic pigments comprise aluminum, bronze, brass, chromium, copper, gold, iron, molybdenum, nickel, tin, titanium, zinc and the like. A "cornflake" type or corrugated irregularly shaped planar flake of aluminum or bronze may be utilized, although a "silver dollar" type or a circular planar type of flake may also be utilized as metallic pigment. Glitter, which is a special type of aluminum pigment produced from foil, may also be utilized. The foil, typically rolled to gauges of less than 0.025 mm, is typically cut into square, rectangular or hexagonal shapes in sizes from 0.2 mm to about 3 mm, and typically coated with a transparent epoxy lacquer to halt oxidative dulling of the foil. Glitter, with its large particle sizes, can produce discrete highlights of metallic sparkle. Gold bronzes are typically alloys of copper and zinc with a small amount of aluminum to reduce oxidation. The range of gold colors is produced by varying proportions of major alloy components. The green gold alloy typically contains 70 percent copper, and color becomes redder as the percentage of copper is increased; 90 percent copper produces pale gold; deep gold is made by controlled oxidation of the alloys. Gold bronzes are usually utilized in flake form, with coarser grades giving more brilliance. Metallic flakes such as copper must be utilized with care, however, as they may be susceptible to heat, moisture and corrosives. The metallic pigment may optionally be coated, for example, with rosin or fatty acids, such as oleic or linoleic acid. Optionally, the metallic pigment may be initially in granular form comprising a carrier, which may comprise at least one polymer. In granular form the metallic pigment typically represents about 70-80% of the granule with the remainder being the carrier. Said pigments can be used to produce or enhance bright sparkle as well as hammer and leafing finishes in multilayer composites in embodiments of the invention. When metallic pigments and/or mineral flakes are present, they are used in one embodiment in an amount of about 0.05 wt. % to about 7 wt. %, and in another embodiment in an amount of about 0.3 wt. % to about 7 wt. % based on the weight of the resinous component of the layer in which they are present, with about 0.5 wt. % to about 5.0 wt. % being preferred. Illustrative examples of suitable metallic pigments comprise those with the tradename SILVET® available from Silberline Manufacturing Co., Tamaqua, Pa.

Rubber modified thermoplastic resins of the second and fourth layers may optionally comprise other additives known in the art in addition to those included to produce special visual effects. Illustrative additives include, but are not limited to, stabilizers, such as color stabilizers, heat stabilizers, light stabilizers, antioxidants, UV screeners, and UV absorbers; flame retardants, anti-drip agents, lubricants, flow promoters and other processing aids; plasticizers, antistatic agents, mold release agents, impact modifiers, fillers, and colorants such as dyes and pigments which may be organic, inorganic or organometallic; and like additives. Other illustrative additives include, but are not limited to, silica, silicates, zeolites, titanium dioxide, stone powder, glass fibers or spheres, carbon fibers, carbon black, graphite, calcium carbonate, talc, lithopone, zinc oxide, zirconium silicate, iron oxides, diatomaceous earth, calcium carbonate, magnesium oxide, chromic oxide, zirconium oxide, aluminum oxide, alumina trihydrate, magnesium hydroxide, barium sulphate, crushed quartz, clay, calcined clay, talc, kaolin, asbestos, cellulose, wood flour, cork, cotton and synthetic textile fibers, especially reinforcing fillers such as glass fibers, carbon fibers, and metal fibers. Often more than one additive is included in rubber modified thermoplastic resins of the second and fourth layers of the invention, and in some embodiments more than one additive of one type is included. In a particular embodiment a rubber modified thermoplastic resin of either or both of the second or fourth layers further comprises an additive selected from the group consisting of colorants, dyes, pigments, lubricants, stabilizers, heat stabilizers, light stabilizers, antioxidants, UV screeners, UV absorbers, fillers and mixtures thereof.

The multilayer composites of the present invention comprise and can be employed in the formation of useful articles. Suitable articles include, but are not limited to, those typically used in applications requiring special visual effect properties and/or weatherable properties. Some particular suitable articles comprise those in which the composites of the invention are joined to a substrate. In particular embodiments suitable substrates include, but are not limited to, those which are metal, glass, cellulosic, ceramic, thermoplastic or thermosetting. In preferred embodiments suitable substrates comprise those which are thermoplastic or thermosetting. In some particular embodiments suitable substrates are reinforced with a suitable reinforcing agent. Some particular articles comprising a multilayer composite of the invention include, but are not limited to, outdoor vehicle and device (OVAD) applications, boat hulls, hot tubs, bath tubs, electric vehicle body panels, tractor hoods, sea kayaks, spare tire covers, auto rooftop cargo boxes, pool steps, and the like.

Multilayer composites of the invention and articles derived therefrom may be prepared by known multilayer composite processing techniques. Known multilayer composite processing techniques which may be used include, but are not limited to, profile extrusion, sheet extrusion, coextrusion, molding, extrusion blow molding, thermoforming, injection molding, co-injection molding and rotomolding. The invention further contemplates additional, optional fabrication operations such as, but not limited to, in-mold decoration, baking in a paint oven, surface etching, lamination, and/or thermoforming. In a preferred embodiment multilayer composites of the invention and/or articles derived therefrom are made by a process which comprises at least one thermoforming step. In some embodiments of the invention two or more layers may be processed together before combining with remaining layers to assemble the final multilayer composite.

The multilayer composites of the invention may be suitably used, with or without prior thermoforming into a desired shape, as a coating on a fiber-reinforced polymer substrate. Fiber-reinforced polymer is a material made from fiber reinforcement in a polymer matrix, typically a thermosetting polymer matrix. Examples of fiber reinforcing agents include, but are not limited to, glass fibers. The fiber-reinforced polymer may be applied to the optionally thermoformed multilayer composite as a spray of chopped fibers in resin, or it may be hand-laid as sheets of fibrous material to which the polymer is applied, or applied by any other means known in the art.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. In certain of the following examples ASA graft copolymer comprises 45 wt. % elastomeric phase comprising structural units derived from butyl acrylate, and 55 wt. % grafted thermoplastic phase comprising structural units derived from 30.1% styrene, 13.7% acrylonitrile and 11.1% methyl methacrylate (wt./wt./wt. ratio totaling 55). ABS is CYCOLAC® grade GX3800 obtained from GE Plastics which has a notched Izod impact strength of about 433 Joules per meter at 23° C. and about 299 Joules per meter at minus 30° C., both as measured by ASTM D256; an instrumented impact strength of about 51 Joules at 23° C. as measured by ASTM D3763; a melt viscosity of about 1400 pascals as measured at 240° C. and 100 reciprocal seconds according to ASTM D3825; and a melt volume rate of about 4 cubic centimeters per 10 minutes as measured at 220° C. and 10 kilograms according to ISO 1133. The designations of the layer numbers (e.g. second layer, third layer) in the following examples refer to the order of layers given herein above.

EXAMPLE 1

A multilayer composite is prepared comprising a second layer comprising ASA graft copolymer 0.5 mm thick and a third or light-blocking layer comprising a rubber modified poly(methyl methacrylate) either 0.025 mm or 0.13 mm thick. The ASA layer further comprises as additives 4.5 phr mica; 3 phr of a UV absorber; and trace amounts of pigments. The light-blocking layer further comprises 2.5 phr of carbon black.

COMPARATIVE EXAMPLE 1

A multilayer composite is prepared comprising layers and components as in Example 1 except that carbon black in the third layer is replaced by 2.5 phr titanium dioxide.

Figure 3:
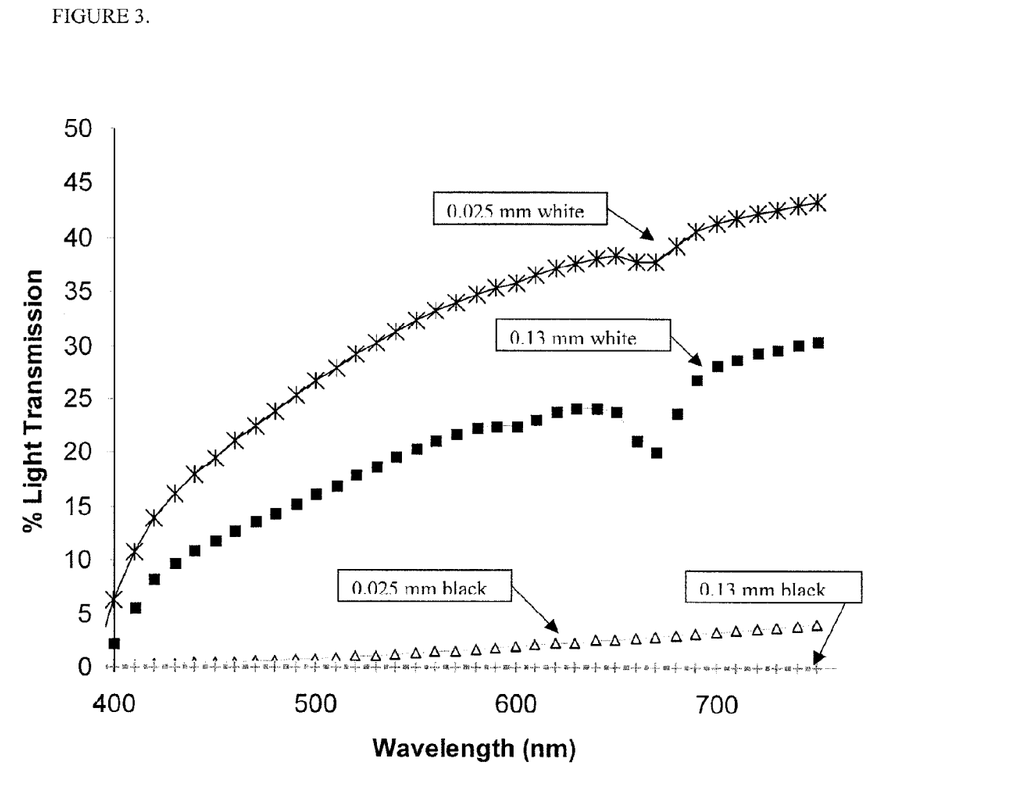
FIG. 3 shows a plot of % light transmission versus wavelength for composites of Example 1 and Comparative Example 1 comprising light-blocking layers with and without carbon black.

FIG. 3 shows a plot of % light transmission versus wavelength for composites of Example 1 and Comparative Example 1. The data show that the composite of Example 1 comprising a light-blocking layer comprising carbon black exhibits excellent opacity to transmitted visible light, while the composite of Comparative Example 1 comprising a light-blocking layer without carbon black exhibits at least partial transmittance of visible light. Thicker layers of light-blocking layer are more effective at blocking visible light transmittance than thinner layers.

EXAMPLE 2

A multilayer composite is prepared comprising a second layer comprising ASA graft copolymer 0.5 mm thick and a third or light-blocking layer comprising a rubber modified poly(methyl methacrylate) either 0.025 mm or 0.13 mm thick. The ASA layer further comprises as additives 8 phr mica; 3 phr of a UV absorber; and trace amounts of pigments. The light-blocking layer further comprises 2.5 phr of carbon black.

COMPARATIVE EXAMPLE 2

A multilayer composite is prepared comprising layers and components as in Example 2 except that carbon black in the third layer is replaced by 2.5 phr titanium dioxide.

Figure 4:
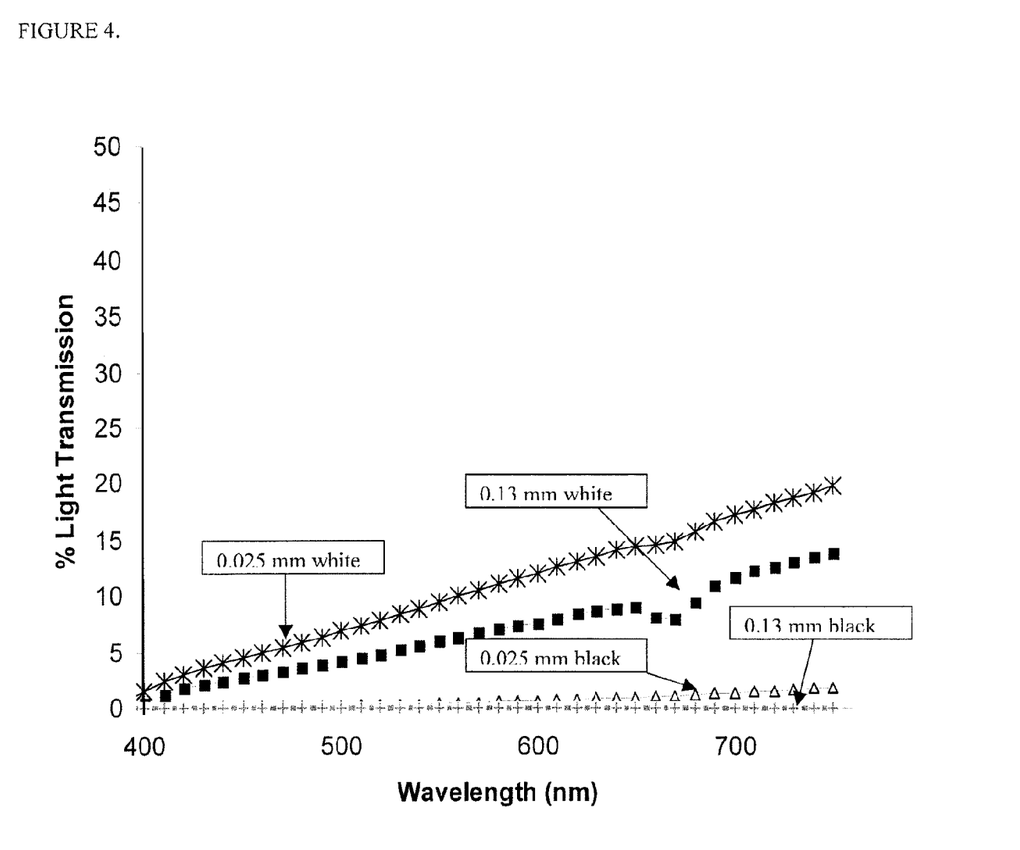
FIG. 4 shows a plot of % light transmission versus wavelength for composites of Example 2 and Comparative Example 2 comprising light-blocking layers with and without carbon black.

FIG. 4 shows a plot of % light transmission versus wavelength for composites of Example 2 and Comparative Example 2. The data show that the composite of Example 2 comprising a light-blocking layer comprising carbon black exhibits excellent opacity to transmitted visible light, while the composite of Comparative Example 2 comprising a light-blocking layer without carbon black exhibits at least partial transmittance of visible light. Thicker layers of light-blocking layer are more effective at blocking visible light transmittance than thinner layers.

EXAMPLE 3

A multilayer composite is prepared comprising a first or outer layer comprising acrylic resin, a second layer comprising an ASA graft copolymer and a third or light-blocking layer comprising an inherently transmissive poly(methyl methacrylate). The ASA layer further comprises at least one additive to provide special visual effects. The light-blocking layer further comprises at least one light-blocking additive.

COMPARATIVE EXAMPLE 3

A multilayer composite is prepared comprising layers and components as in Example 3 except that light-blocking additive in the third layer is absent. A plot of % light transmission versus wavelength for composites of Example 3 and Comparative Example 3 shows that the composite of Example 3 comprising a light-blocking layer comprising a light-blocking additive exhibits excellent opacity to transmitted visible light, while the composite of Comparative Example 3 comprising a light-blocking layer without a light-blocking additive exhibits at least partial transmittance of visible light.

EXAMPLE 4

A multilayer composite is prepared comprising a first or outer layer comprising acrylic resin, a second layer comprising an ASA graft copolymer, a third or light-blocking layer comprising poly(methyl methacrylate), a fourth layer comprising ABS, and a fifth layer comprising a tielayer. The composite is joined to a fiber-reinforced polymer substrate adjacent to the tielayer. The ASA layer further comprises at least one additive to provide special visual effects. The light-blocking layer further comprises at least one light-blocking additive.

COMPARATIVE EXAMPLE 4

A multilayer composite is prepared comprising layers and components as in Example 4 except that the fourth layer comprising ABS is absent. A comparison of physical properties for composites of Example 4 and Comparative Example 4 shows that the composite of Example 4 comprising a fourth layer comprising ABS exhibits improved melt strength and impact strength compared to the composite of Comparative Example 4 without a fourth layer comprising ABS.

EXAMPLE 5

A multilayer composite is prepared comprising a first or outer layer comprising acrylic resin, a second layer comprising an ASA graft copolymer and a third or light-blocking layer comprising an ASA graft copolymer and at least one light-blocking additive. The second layer further comprises at least one additive to provide special visual effects.

COMPARATIVE EXAMPLE 5

A multilayer composite is prepared comprising layers and components as in Example 5 except that light-blocking additive in the third layer is absent. A plot of % light transmission versus wavelength for composites of Example 5 and Comparative Example 5 shows that the composite of Example 5 comprising a light-blocking layer comprising a light-blocking additive exhibits excellent opacity to transmitted visible light, while the composite of Comparative Example 5 comprising a light-blocking layer without a light-blocking additive exhibits at least partial transmittance of visible light.

EXAMPLE 6

A multilayer composite is prepared comprising a first or outer layer comprising acrylic resin, a second layer comprising a ASA graft copolymer, a third or light-blocking layer comprising an ASA graft copolymer and at least one light-blocking additive, a fourth layer comprising ABS, and a fifth layer comprising a tielayer. The composite is joined to a fiber-reinforced polymer substrate adjacent to the tielayer. The second layer further comprises at least one additive to provide special visual effects.

COMPARATIVE EXAMPLE 6

A multilayer composite is prepared comprising layers and components as in Example 4 except that the fourth layer comprising ABS is absent. A comparison of physical properties for composites of Example 6 and Comparative Example 6 shows that the composite of Example 6 comprising a fourth layer comprising ABS exhibits improved melt strength and impact strength compared to the composite of Comparative Example 6 without a fourth layer comprising ABS.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and Patent Applications cited herein are incorporated herein by reference.

The invention claimed is:

1. A multilayer composite comprising, in sequence,
   (i) optionally, an outer layer comprising an acrylic resin which is substantially transparent to visible light, (ii) a second layer comprising a first rubber modified thermoplastic resin which is substantially transparent to visible light, and at least one additive to provide a special visual effect;

(iii) a third layer comprising a light-blocking layer having at least one light-blocking additive selected from the group consisting of carbon black, iron oxide, a dye, and a pigment;

(iv) a fourth layer comprising a second rubber modified thermoplastic resin different from said first rubber modified thermoplastic resin;

(v) optionally, a fifth layer comprising a tielayer; and (vi) optionally, a substrate layer.

2. The composite of claim 1, wherein the outer layer is present.

3. The composite of claim 2, wherein the outer layer further comprises at least one ultraviolet light stabilizer.

4. The composite of claim 2, wherein the outer layer comprises a rubber modified thermoplastic acrylic resin.

5. The composite of claim 1, wherein the resinous component of the second layer consists essentially of the first rubber modified thermoplastic resin.

6. The composite of claim 1, wherein both the first and second rubber modified thermoplastic resin independently comprise a discontinuous elastomeric phase dispersed in a rigid thermoplastic phase, wherein at least a portion of the rigid thermoplastic phase is grafted to the elastomeric phase.

7. The composite of claim 6, wherein the elastomeric phase of the first rubber modified thermoplastic resin comprises a polymer having structural units derived from butyl acrylate.

8. The composite of claim 6, wherein the rigid thermoplastic phase of the first rubber modified thermoplastic resin comprises structural units derived from a mixture of monomers selected from the group consisting of vinyl aromatic monomers, monoethylenically unsaturated nitrile monomers, ($C_1$-$C_{12}$)alkyl- and aryl-(meth)acrylate monomers, and mixtures thereof.

9. The composite of claim 8, wherein the rigid thermoplastic phase of the first rubber modified thermoplastic resin comprises structural units derived from styrene and acrylonitrile; or alpha-methyl styrene and acrylonitrile; or styrene, alpha-methyl styrene, and acrylonitrile; or styrene, acrylonitrile, and methyl methacrylate; or alpha-methyl styrene, acrylonitrile and methyl methacrylate; or styrene, alpha-methyl styrene, acrylonitrile and methyl methacrylate.

10. The composite of claim 1, wherein the additive providing a special visual effect comprises a colorant, a dye, a pigment, mineral flakes, mica, glass flakes, fibers, or spheres, particles of crosslinked polymer, particles of crosslinked acrylic resin, a metallic pigment, metal flakes, or mixtures comprising at least one of such additives.

11. The composite of claim 1, wherein the light-blocking layer blocks at least about 90% of the visible light transmitted by preceding layers.

12. The composite of claim 11, wherein the light-blocking layer further comprises at least one ultraviolet light stabilizer.

13. The composite of claim 11, wherein the light-blocking layer comprises at least one acrylic resin.

14. The composite of claim 13, wherein the light-blocking layer comprises either ASA or a rubber modified poly(methyl methacrylate).

15. The composite of claim 6, wherein the elastomeric phase of the second rubber modified thermoplastic resin comprises a polymer having structural units derived from butadiene.

16. The composite of claim 15, wherein the rigid thermoplastic phase of the second rubber modified thermoplastic resin comprises structural units derived from a mixture of monomers selected from the group consisting of vinyl aromatic monomers, and monoethylenically unsaturated nitrile monomers.

17. The composite of claim 16, wherein the rigid thermoplastic phase of the second rubber modified thermoplastic resin comprises structural units derived from styrene and acrylonitrile; or alpha-methyl styrene and acrylonitrile; or styrene, alpha-methyl styrene, and acrylonitrile.

18. The composite of claim 6, wherein the second rubber modified thermoplastic resin further comprises at least one polycarbonate.

19. The composite of claim 1, wherein the fifth layer is present.

20. The composite of claim 19, wherein the fifth layer is identical to the third layer.

21. The composite of claim 1, wherein the substrate is present.

22. The composite of claim 21, wherein the substrate is selected from the group consisting of metal, glass, cellulose, ceramic, a thermoplastic polymer, and a thermosetting polymer.

23. The composite of claim 22 wherein the substrate comprises a fiber-reinforced thermosetting polymer.

24. A multilayer composite comprising, in sequence, (i) an outer layer comprising an acrylic resin which is substantially transparent to visible light, wherein the said outer layer optionally comprises at least one ultraviolet light stabilizer, (ii) a second layer comprising an acrylonitrile-styrene-acrylate graft copolymer which is substantially transparent to visible light, and at least one additive to provide a special visual effect, wherein the additive comprises a colorant, a dye, a pigment, mineral flakes, mica, glass flakes, fibers, or spheres, particles of crosslinked polymer, particles of crosslinked acrylic resin, a metallic pigment, metal flakes, or mixtures comprising at least one of such additives;

(iii) a third layer comprising an acrylic resin and at least one additive selected from the group consisting of carbon black, iron oxide, a dye, and a pigment;

(iv) a fourth layer comprising an ABS graft copolymer and, optionally, at least one polycarbonate with structural units derived from bisphenol A;

(v) optionally, a fifth layer comprising a tielayer; and (vi) optionally, a substrate layer.

25. The composite of claim 24, wherein the outer layer comprises a rubber modified thermoplastic acrylic resin.

26. The composite of claim 24, wherein the fifth layer is present.

27. The composite of claim 26, wherein the fifth layer is identical to the third layer.

28. The composite of claim 24, wherein the substrate is present and is selected from the group consisting of metal, glass, cellulose, ceramic, a thermoplastic polymer, and a thermosetting polymer.

29. The composite of claim 28 wherein the substrate comprises a fiber-reinforced thermosetting polymer.

30. The composite of claim 24 wherein the resinous component of the second layer consists essentially of acrylonitrile-styrene-acrylate graft copolymer.

31. An article made from the composite of claim 1.

32. The article of claim 31 made by a process comprising sheet extrusion or thermoforming or both.

33. An article made from the composite of claim 24.

34. The article of claim 33 made by a process comprising sheet extrusion or thermoforming or both.

* * * * *

UNITED STATES PATENT AND TRADEMARK OFFICE
CERTIFICATE OF CORRECTION

| | |
|---|---|
| PATENT NO. | : 7,357,988 B2 |
| APPLICATION NO. | : 11/761753 |
| DATED | : April 15, 2008 |
| INVENTOR(S) | : Douglas Warren Howie |

It is certified that error appears in the above-identified patent and that said Letters Patent is hereby corrected as shown below:

Column 24, Line 44, in Comparative Example 6, delete "Example 4" and insert --Example 6--

Signed and Sealed this
Fifth Day of April, 2011

David J. Kappos
*Director of the United States Patent and Trademark Office*